United States Patent
Inaoka et al.

(10) Patent No.: US 6,762,325 B2
(45) Date of Patent: Jul. 13, 2004

(54) METHOD FOR PRODUCTION OF ALKOXYLATED COMPOUND

(75) Inventors: Toru Inaoka, Yokohama (JP);
Yasuhiko Sato, Yokohama (JP);
Yoshiyuki Onda, Tokyo (JP);
Hiromichi Tanaka, Toyonaka (JP);
Tsuyoshi Hirata, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 24 days.

(21) Appl. No.: 10/144,491

(22) Filed: May 13, 2002

(65) Prior Publication Data

US 2003/0004377 A1 Jan. 2, 2003

(30) Foreign Application Priority Data

May 16, 2001 (JP) ........................................ 2001-146786
Mar. 19, 2002 (JP) ........................................ 2002-076957

(51) Int. Cl.$^7$ .................... C07C 213/00; C07C 41/03
(52) U.S. Cl. .................... 564/505; 564/503; 564/511; 564/512; 568/618; 568/619; 568/620
(58) Field of Search .................... 564/503, 505, 564/511, 512; 568/618, 619, 620

(56) References Cited

U.S. PATENT DOCUMENTS

| | | | |
|---|---|---|---|
| 3,872,170 A | | 3/1975 | Bosche et al. ............... 564/293 |
| 4,396,780 A | * | 8/1983 | Shtykh et al. ............... 568/620 |
| 5,126,493 A | * | 6/1992 | Hoelderich et al. ......... 568/616 |
| 5,689,012 A | | 11/1997 | Pazos et al. ................. 568/619 |

FOREIGN PATENT DOCUMENTS

| | | | | |
|---|---|---|---|---|
| EP | 0 465 703 A1 | 1/1992 | ............. | B01F/7/16 |
| EP | 0 860 449 A1 | 8/1998 | ............. | C08F/2/00 |
| GB | 1 541 176 | 2/1979 | ........... | C08G/65/26 |
| WO | WO 97/23546 | 3/1997 | ........... | C08G/65/26 |

OTHER PUBLICATIONS

Anonymous, "Chemical Reactor With Floating Head or Cover—to Minimise Fouling by Eliminating Vapor–Liq. Interface," Oct. 10, 1984, vol. 246, No. 12.

* cited by examiner

*Primary Examiner*—Rosalynd Keys
(74) *Attorney, Agent, or Firm*—Mathews, Collins, Shepherd & McKay, P.A.

(57) ABSTRACT

When the reaction solution formed during the addition of an alkylene oxide to an active hydrogen-containing compound has viscosity of not less than 10 mPa·s, this invention provides a method for stirring the reaction solution by the rotation of a vane or vanes continuously disposed in the vertical direction within an agitating reaction vessel in such a manner that the numerical value C represented by the following formula (1):

$$C = A/(h_2 - h_1) \qquad (1)$$

(wherein A denotes the length (m) of the vane or the vanes newly immersed by the supply of alkylene oxide, $h_1$ denotes the height (m) of the liquid level before the supply of alkylene oxide, and $h_2$ denotes the height (m) of the liquid level after the supply of alkylene oxide) may be not less than 0.5. By employing the method of this invention, it is made possible to effect addition of an alkylene oxide to the active hydrogen-containing compound with high efficiency. Further, the use of this method allows repression of the content of a by-product which causes the degradation of the characteristic properties of the alkoxylated compound.

10 Claims, 5 Drawing Sheets

METHOD FOR PRODUCTION OF ALKOXYLATED COMPOUND

BACKGROUND OF THE INVENTION

1. Field of the Invention

This invention relates to a method for the addition of an alkylene oxide to such an active hydrogen-containing compound as a polyalkylene imine or an unsaturated alcohol.

2. Description of the Related Art

The alkylene oxide adducts (alkoxylated compounds) of such active hydrogen-containing compounds as polyalkylene imines and unsaturated alcohols are widely used as raw materials for various detergents and chemical products. As a method for effecting the addition of an alkylene oxide, the practice of performing the reaction of an active hydrogen-containing compound with an alkylene oxide in the presence of an acid catalyst or a base catalyst. PCT International Publication 97/23,546, for example, discloses a method for the addition of a polyethylene oxide to a polyamine, and more particularly a method which comprises adding about 1 mol of ethylene oxide to 1 mol of the NH bond contained in a polyamine, adding a catalyst, and thereafter further adding a prescribed amount of ethylene oxide.

When an alkylene oxide is supplied to a reaction solution, the portion of the alkylene oxide which has been supplied in excess of the solubility of the reaction solution exists in the gas phase of the reaction vessel. The alkylene oxide in the gas phase, when the alkylene oxide concentration in the liquid phase falls below the solubility in consequence of the advance of an alkylene oxide addition reaction, is absorbed in the liquid phase and used to the further alkylene oxide addition reaction.

Under the reaction conditions such that the reaction solution has high viscosity, however, since the alkylene oxide present in the gas phase is absorbed slowly into the liquid phase, the liquid phase cannot secure sufficient supply of the alkylene oxide and the pressure of the reaction vessel falls with difficulty. As a result, the absorption of the alkylene oxide into the liquid phase forms a rate-determining step and incurs the problem of lowering the rate of the target reaction of the alkylene oxide with an active hydrogen-containing compound. The lowered rate of the reaction not only degrades the productivity but also causes formation of impurities and coloration of the reaction solution.

Further, the alkylene oxide addition reaction has the problem of by-producing a component that degrades the characteristic properties of the alkoxylated compound owing to the decomposition of the adduct formed and the reaction of the water present in the reaction system with the alkylene oxide.

It is, therefore, an object of this invention to provide a method for the production of an alkoxylated compound, which enables an alkylene oxide to be efficiently added to an active hydrogen-containing compound even when the reaction solution has high viscosity.

It is another object of this invention to provide a method for the production of an alkoxylated compound, which is capable of controlling the content of a by-product which forms a cause for the degradation of the characteristic properties of the alkoxylated compound.

SUMMARY OF THE INVENTION

This invention concerns a method for producing an alkoxylated compound by supplying an alkylene oxide to an active hydrogen-containing compound delivered to an agitating reaction vessel, characterized by a reaction solution in the process of an alkylene oxide addition reaction having highest viscosity of not less than 10 mPa·s, the reaction solution being stirred by the rotation of a vane or vanes continuously disposed in the vertical direction in the agitating reaction vessel, and the numerical value C represented by the following formula (1):

$$C = A/(h_2 - h_1) \qquad (1)$$

(wherein A denotes the length (m) of the vane or the vanes newly immersed by the supply of alkylene oxide, $h_1$ denotes the height (m) of the liquid level before the supply of alkylene oxide, and $h_2$ denotes the height (m) of the liquid level after the supply of alkylene oxide) being not less than 0.5.

In the addition of an alkylene oxide to an active hydrogen-containing compound, the absorption into the liquid phase of the alkylene oxide present in the gas phase can be promoted by stirring the neighborhood of the surface of the reaction solution so as to satisfy the conditions mentioned above. Even when the reaction solution has high viscosity, therefore, the alkylene oxide can be added highly efficiently to the active hydrogen-containing compound. Further, the amount of the by-product can be decreased because the reaction time can be shortened.

This invention further concerns a method for producing an alkoxylated compound by supplying an alkylene oxide to an active hydrogen-containing compound delivered to an agitating reaction vessel, characterized by the reaction solution being stirred by the rotation of a vane or vanes disposed continuously in the vertical direction in the agitating reaction vessel, the reaction solution being stirred to remove impurities and/or a solvent by the rotation of the vane or the vanes after the addition of alkylene oxide, and the numerical value C' represented by the following formula (2):

$$C' = B/(h_2 - h_3) \qquad (2)$$

(wherein B denotes the length (m) of the vane or the vanes newly exposed to the gas phase in consequence of the decrease of the reaction solution, $h_2$ denotes the height (m) of the liquid level after the supply of the alkylene oxide, and $h_3$ denotes the height (m) of the liquid level after the treatment for removal of impurities or solvent) being not less than 0.5.

By stirring the neighborhood of the surface of the reaction solution so as to satisfy the conditions mentioned above after the addition of an alkylene oxide, it is made possible to deprive the reaction solution of the by-produced impurities or the solvent highly efficiently. Further, this invention concerns a method for producing an alkoxylated compound having an average addition number of not less than 40 mols of alkylene oxide by supplying an alkylene oxide to an alkenyl group-containing hydroxy compound in the presence of a catalyst, characterized by the reaction temperature (X), reaction time (Y), and catalyst concentration (Z) during the alkylene oxide addition reaction satisfying the following formula (3):

Numerical Value $J = 300 + 0.033X^2Y - 6.5XY + 300Z + 330Y < 1900$ (3)

(wherein X denotes the reaction temperature (° C.), Y denotes the reaction time (time (hr) for the introduction of alkylene oxide+time (hr) for aging), and Z denotes the catalyst concentration (the mass % of the catalyst relative to the theoretical quantity of the alkoxylated compound calculated from the quantities of a charged raw materials).

In the addition reaction of an alkylene oxide, by performing the addition reaction under conditions allowing the reaction temperature (X), the reaction time (Y), and the catalyst concentration (Z) to satisfy the specific relation, it is made possible to control the by-production of a polyalkylene oxide.

The foregoing aspects of the invention concerning the production of an alkoxylated compound may be implemented in combination. In the case of such a combination, the effects of the individual aspects of the invention can be manifested jointly.

The above and other objects, features, and advantages of the present invention will become clear from the following description of the preferred embodiments.

DESCRIPTION OF THE PREFERRED EMBODIMENT

Figure 1:
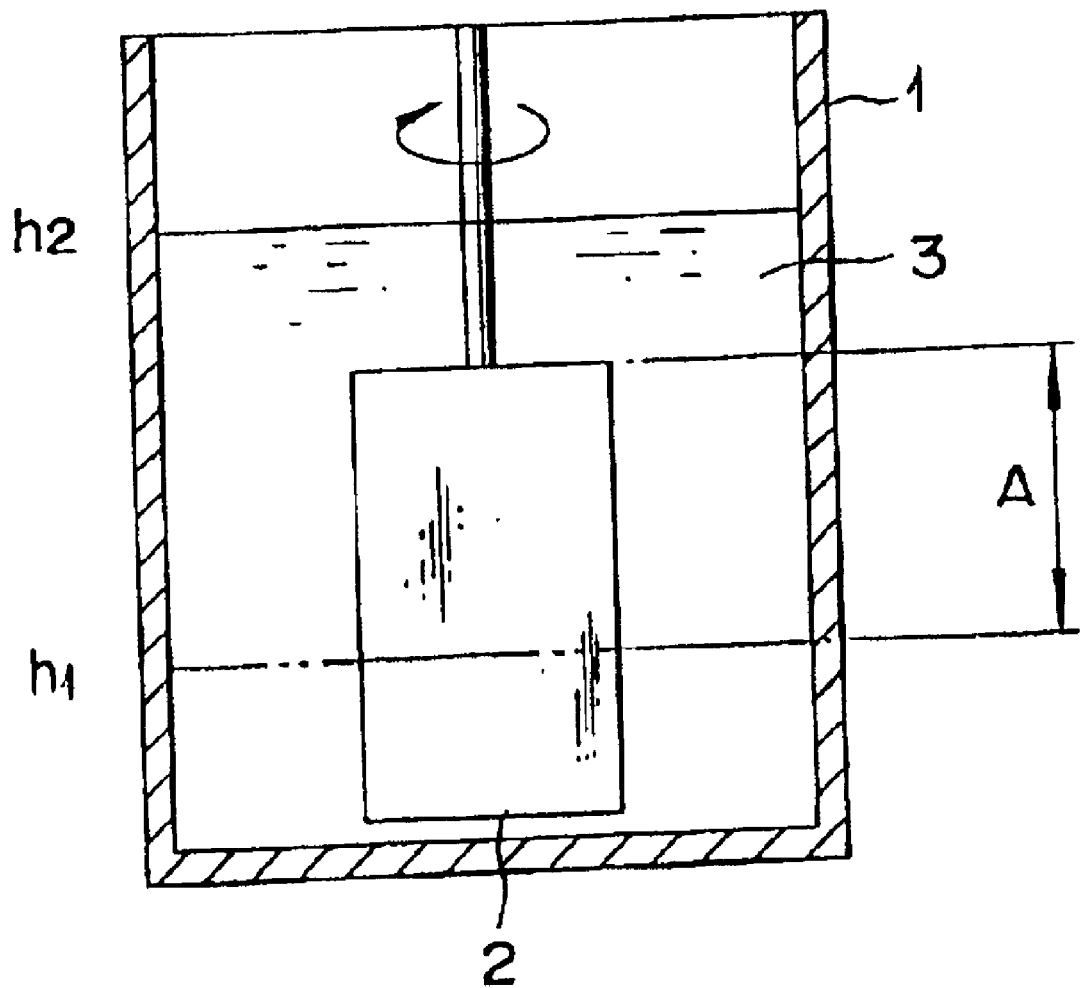
FIG. 1 is a schematic diagram depicting the condition of stirring in an agitating reaction vessel provided therein with a flat plate type vane.

The relation between the vane and the liquid level during the course of an alkylene oxide addition reaction will be explained below with reference to FIG. 1. FIG. 1 is a schematic diagram of an agitating reaction vessel 1 provided with a vane 2 for stirring a reaction solution 3. The symbol $h_1$ denotes the height (m) of the liquid level of a reaction solution before the supply of an alkylene oxide, i.e. the liquid level of a solution containing an active hydrogen-containing compound. The term "height of liquid level" as used in this invention refers to the height of the liquid level from the bottom of the reaction vessel while the solution is left at rest. Then, the term "agitating reaction vessel" refers to a vessel with vane(s) 2 in which the reaction of an active hydrogen-containing compound and an alkylene oxide proceeds and the term "reaction solution" refers to the liquid which exists as a liquid phase in the agitating reaction vessel and allows the reaction of an active hydrogen-containing compound with an alkylene oxide to proceed.

The alkylene oxide is supplied to the reaction solution 3 which is in a stirred state and the liquid level of the reaction solution 3 rises. At this time, by using the vane 2 to stir the gas-liquid interface, the alkylene oxide present in the gas phase is enabled to be effectively absorbed in the liquid phase. The vane 2, therefore, is so disposed as to extend from the liquid level before the supply of the alkylene oxide in the direction of the gas phase. Preferably, the vane is allowed to exist in the gas-liquid interface and consequently enabled to stir the gas-liquid interface even after the liquid level of the reaction solution 3 has risen. Though the vane is preferred to be present in the gas-liquid interface at the time that the supply of the alkylene oxide is started, this invention does not exclude the case in which the vane is not present in the gas-liquid interface. To be specific, it is necessary for the purpose of securing the effect of this invention that the numerical value C, expressed by the following formula (1):

$$C = A/(h_2 - h_1) \tag{1}$$

wherein $h_2$ denotes the height (m) of the liquid level after the supply of an alkylene oxide (the height of the liquid level after completion of the supply of the alkylene oxide) being not less than 0.5. The symbol A in this formula denotes the length (m) of the vane or the vanes newly immersed in the reaction solution 3 in consequence of the supply of the alkylene oxide. When the vane 2 is completely immersed in the reaction solution 3 in consequence of the supply of the alkylene oxide, the height, $h_2$ represents the numerical value given as the length from the height $h_1$ of the liquid level at the time of starting the supply to the upper edge of the vane 2. Where a plurality of vanes is intermittently disposed, the length A refers to the total of the part in which the vanes are actually disposed. In the case of an agitating reaction vessel which is provided with vanes of 0.4 m disposed intermittently in the vertical direction as spaced at intervals of 0.1 m, for example, a rise of 2 m in the liquid level sets the A value at 1.6 m. For the purpose of efficiently acquiring the effect of this invention, the numerical value C, is preferably not less than 0.6, more preferably not less than 0.7, still more preferably not less than 0.8, particularly preferably not less than 0.9, and most preferably 1. The case in which the numerical value C, is 1 describes the stirring conditions under which the vane 2 is always present in the gas-liquid interface during the course of the reaction.

Figure 2:
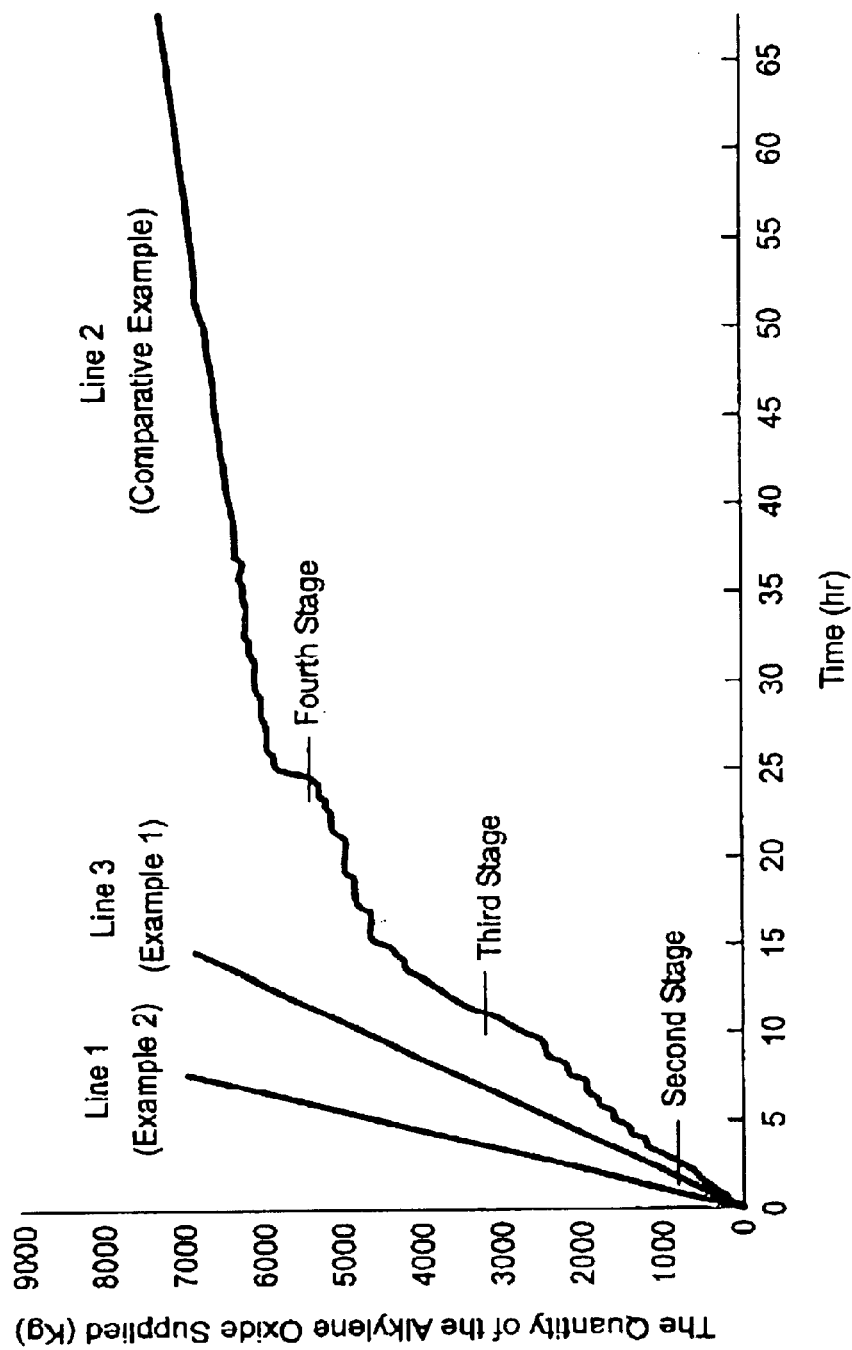
FIG. 2 is a graph illustrating the effects of the stirring vane on the addition of an alkylene oxide.

The effect of the stirring vanes on the alkylene oxide addition will be explained below with reference to FIG. 2. Line 1 represents the data obtained by using an agitating reaction vessel (C=1) so designed that the agitator of the type illustrated in FIG. 7 may be constantly present in the gas-liquid interface even when the gas-liquid interface rises, Line 2 represents the data obtained by using an agitating reaction vessel (C=0.11) provided with intermittently disposed four vanes of the type illustrated in FIG. 6, and Line 3 represents the data obtained by using an agitating reaction vessel C=1) so designed that the vane of the type illustrated in FIG. 4 may be constantly present in the gas-liquid interface even when the gas-liquid interface rises. In the construction of the reaction vessel which has yielded the data of Line 2, the adjacent vanes are separated with a sufficiently large interval. The alkylene oxide addition reaction is made to proceed so that the pressure of the gas phase in the agitating reaction vessel may remain constant. Specifically, the agitating reaction vessel is so designed that when the pressure of the gas phase is lowered in consequence of the absorption of the alkylene oxide into the solution, the alkylene oxide may be newly supplied to compensate for the loss of the pressure. In the graph, the horizontal axis is the scale for the time elapsing from the start of supply of the alkylene oxide and the vertical axis is the scale for the quantity of the alkylene oxide supplied.

In Line 1 and Line 3, since the vanes are constantly present in the gas-liquid interface and are operated to produce sufficient agitation, the solution of the alkylene oxide into the liquid phase proceeds at a fixed rate and at a sufficiently high speed. Meanwhile, in Line 2, the speed of solution of the alkylene oxide into the liquid phase increases when the vanes are present (near the positions indicated as "second stage," "third stage," and "fourth stage" in the graph). The speed of this solution, however, falls when the gas-liquid interface rises in consequence of the supply of the alkylene oxide and no vane is present in the gas-liquid interface. As a result, the time required for the solution is elongated as shown in FIG. 2 and this elongation brings such defects as lowering the productivity and inducing generation of impurities and coloration.

The reaction solution at the end of the alkylene oxide addition contains unaltered portions of raw materials, a product having ethylene oxide added in a small number of mols, by-produced impurities (2,3-butanedion, acetonitrile, and lower amines having molecular weights of not more than 200), a solvent contained during the supply of an active hydrogen-containing compound and an alkylene oxide, and a solvent used for the addition of a catalyst. The reaction solution, therefore, is preferred to be deprived of the impurities and the solvents with a view to heighten the purity of the product. In this case, the exaltation of the purity can be attained efficiently by utilizing the stirring motion of the vane(s) 2. Specifically, the impurities and/or the solvents in the liquid phase can be efficiently gasified and removed efficiently by stirring the gas-liquid interface by the action of the vane(s) 2 similarly to the operation of supplying the alkylene oxide. The vane(s) 2, therefore, is preferred to be present in the gas-liquid interface and to keep the gas-liquid interface stirred even when the liquid level of the reaction solution 3 is lowered. To be specific, the removal of the impurities and/or the solvents is preferred to be effected by utilizing the rotation of the vane or the vanes in stirring the reaction solution so that the numerical value C', represented by the following formula (2):

$$C'=B/(h_2-h_3) \qquad (2)$$

wherein $h_2$ denotes the height (m) of the liquid level after the supply of the alkylene oxide and $h_3$ denotes the height (m) of the liquid level after the treatment for removal of the impurities and the solvents (at the time of the completion of the treatment). Incidentally, the symbol B, in the formula denotes the length (m) of the vane or the vanes newly exposed in the gas phase by the decrease of the reaction solution in consequence of the removal of the impurities and/or the solvents and represents the numerical value given as the length of the agitating reaction vessel in the axial direction. The fall of the liquid level hardly occurs actually when no solvent is used during the supply of the active hydrogen-containing compound and/or the alkylene oxide. In this case, it suffices to adjust the conditions so that the vane is present in the gas-liquid interface at the time that the removal of the impurities and/or the solvents is started. The removal of the impurities and/or the solvents may be effected by using the agitating reaction vessel which has been used in the alkylene oxide addition reaction or by using an agitating reaction vessel which is separately operated for removing the impurities. Further, the removal of the impurities and/or the solvents mentioned above brings a further enhanced effect when it is implemented in combination with the bubbling with an inert gas which will be described more specifically herein below. It is also effective to carry out the removal in combination with simple distillation, thin-film distillation, or treatment with a spray drier, for example. For the purpose of obtaining the effect of this invention more efficiently, the numerical value C' is preferably not less than 0.6, more preferably not less than 0.7, still more preferably not less than 0.8, particularly preferably not less than 0.9, and most preferably 1. Incidentally, the fact that the numerical value C', is 1 represents the conditions of stirring under which the vane(s) 2 is/are constantly present in the gas-liquid interface during the course of process.

The method of this invention can be applied to the reaction solution 3 without reference to the viscosity thereof. It can attain a particularly favorable effect when it is applied to the reaction solution having high viscosity. From this point of view, this invention proves favorable when the highest viscosity of the reaction solution 3 is not less than 10 mPa·s. This invention proves more favorable when the highest viscosity is not less than 30 mPa·s, still more favorable when the highest viscosity is not less than 50 mPa·s, and particularly favorable when the highest viscosity is not less than 100 mPa·s. The upper limit of the highest viscosity does not need to be particularly defined in this invention. Since the reaction solution is stirred with difficulty when the viscosity exceeds a prescribed level, the upper limit is preferably not more than 200,000 mPa·s, more preferably not more than 30,000 mPa·s, and particularly preferably not more than 10,000 mPa·s. The viscosity of the reaction solution can be determined by the use of a Brookfield type viscosimeter.

Now, such devices as the agitation reaction vessel and the vane which are used in the present invention will be described in detail below.

Figure 3:
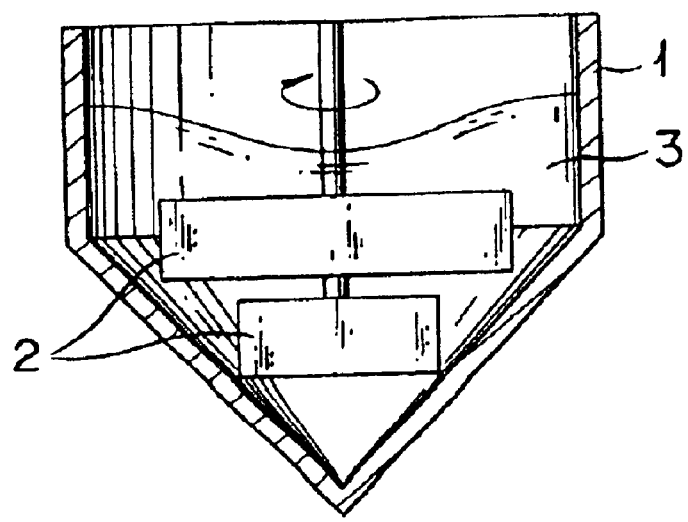
FIG. 3 is a schematic diagram of an agitating reaction vessel so shaped as to have the diameter thereof increased stepwise toward the upper side.

The shape of the agitating reaction vessel is not limited to specific types. For the purpose of accomplishing the efficient stirring, it is proper to use an agitating reaction vessel which has a circular cross section in the lateral direction. As concrete examples of the shape, a cylinder and such a shape that the diameter of the agitating reaction vessel increases stepwise toward the upper part thereof as illustrated in FIG. 3 may be cited. When the agitating reaction vessel constructed as illustrated in FIG. 3 is used, the ratio of the quantity of the targeted product to the quantity of the initial charge can be increased and the number of the mols of added alkylene oxide can be heightened. This invention is particularly effective when the change in the height of the liquid level is large. Specifically, it is effective when the ratio of the height (m) of the liquid level after the supply of the alkylene oxide to the of the height (m) of the liquid level before the supply of the alkylene oxide ($h_2/h_1$) is not less than 1.5, more effective when the ratio is not less than 2, and particularly effective when the ratio is not less than 3. The agitating reaction vessel, in consideration of the area of the gas-liquid interface relative to the quantity of the reaction solution, is preferred to be such that the ratio of the height (m) of the largest liquid level to the diameter (m) of the agitating reaction vessel (L/S) may be as small as permissible. On the other hand, the effect of this invention is prominent when the agitating reaction vessel is so designed that the ratio of the longitudinal and lateral dimensions of the supplied liquid may be not less than 1, more prominent when the ratio is not less than 1.5, and particularly prominent when the ratio is not less than 2. Thus, the agitating reaction vessel is preferred to be so designed that the ratio of the longitudinal and lateral dimensions of the reaction solution supplying part may satisfy the magnitude mentioned above. Though the upper limit of the ratio of the longitudinal and lateral dimensions does not need to be particularly defined, it is practically not more than 5 because the apparatus possibly cause disadvantages concerning the design when the ratio of the longitudinal and lateral dimensions is unduly high. When the agitating reaction vessel having the type of the shape that the diameter of the reaction vessel increases stepwise is used, the expression "diameter of the agitating reaction vessel" means the diameter of the part at which the diameter reaches the maximum. The degree of the stepwise expansion is advantageous in the approximate range of 30~60° for the sake of heightening the effect of increasing the diameter stepwise. In any event, the present invention is not confined within the range mentioned above. Naturally, the range may be properly varied depending on the reaction conditions and the kind of the active hydrogen-containing compound to be used. This invention does not exclude this suitable alteration.

The bottom part and the lid of the agitating reaction vessel do not need to be particularly defined by their shapes. They are allowed to assume various shapes such as flat surface, cones, and ellipses for example. The agitating reaction vessel does not need to be particularly discriminated by scale. For the purpose of securing the effect of this invention on a commercial scale, the inner volume of the agitating reaction vessel is preferably not less than 1 $m^3$, more preferably not less than 5 $m^3$, and particularly preferably not less than 10 $m^3$.

Figure 4:
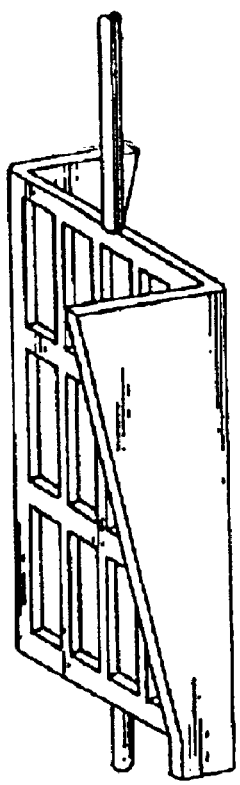
FIG. 4 is a schematic diagram of an agitator of the type formed by the combination of a plurality of flat plates (tornado type).
Figure 5:
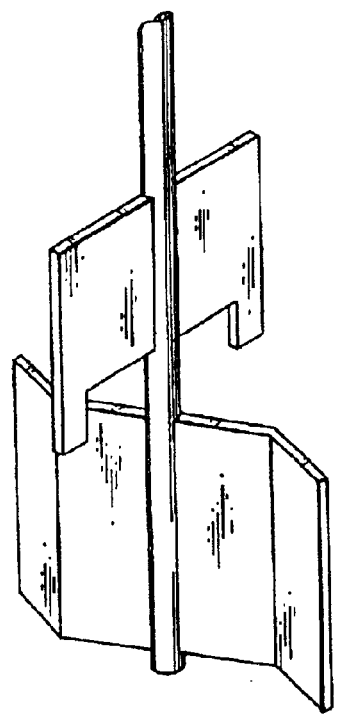
FIG. 5 is a schematic diagram of an agitator of the type having two stirring vanes disposed continuously in the vertical direction (full zone type).
Figure 6:
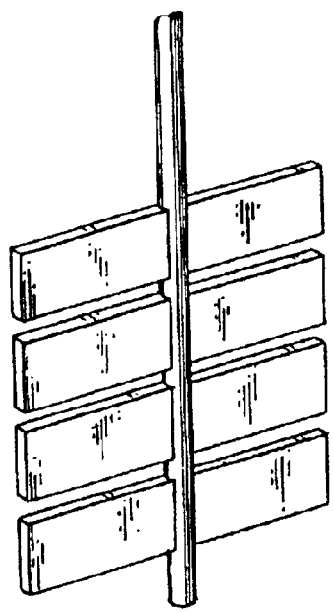
FIG. 6 is a schematic diagram of an agitator of the type having paddle vanes disposed intermittently.
Figure 7:
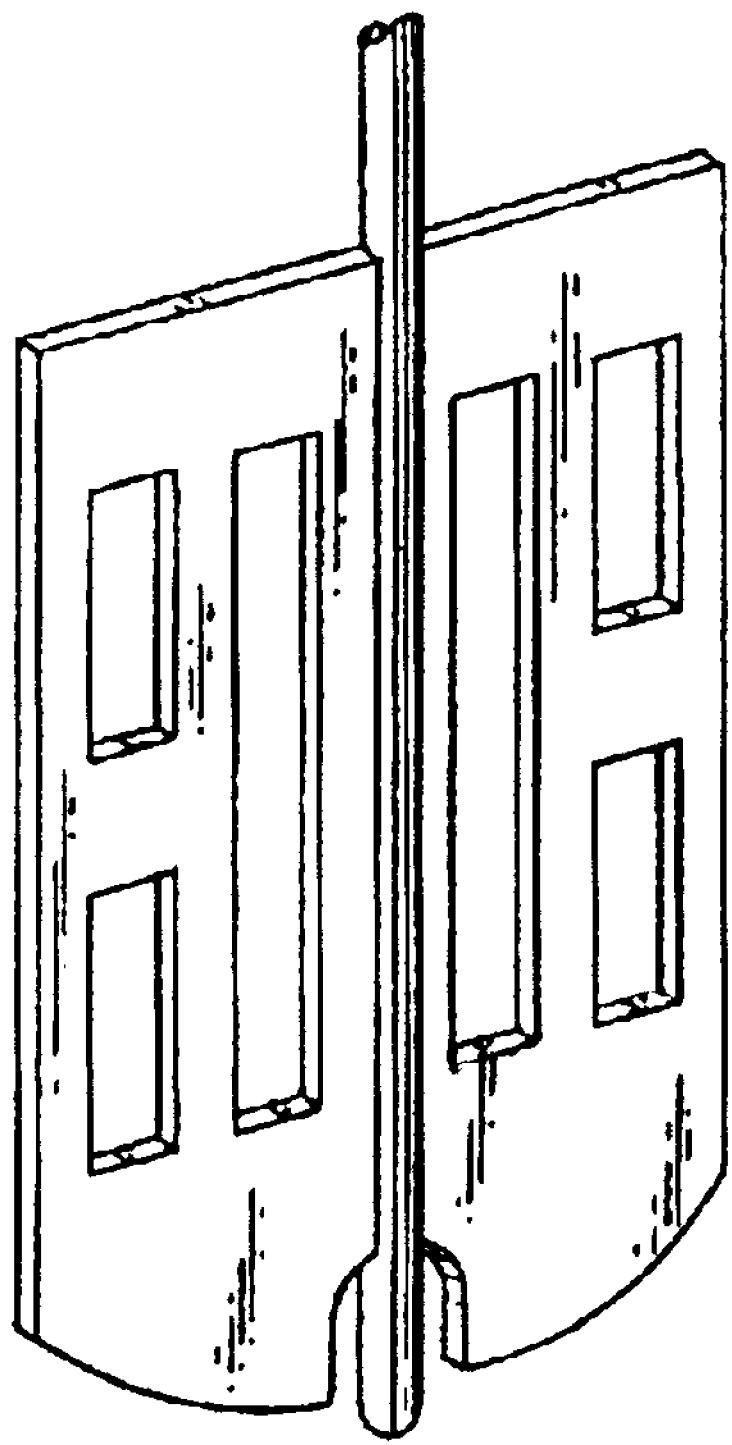
FIG. 7 is a schematic diagram of an agitator of the type so perforated as to enhance the stirring force.

The agitating reaction vessel is provided inside with an agitator having at least one vane 2 which is intended to stir the reaction solution. For the purpose of satisfying the conditions regarding the numerical value C represented by the formula (1) mentioned above, the vane or the vanes is/are preferred to be disposed continuously in the vertical direction inside the agitating reaction vessel. The term "vertical direction" as used in this invention means the direction which is perpendicular to the horizontal plane. The term "disposed continuously" expresses such a concept as embraces various modes including the type having no break in the vertical direction like the type of a flat plate as illustrated in FIG. 1 and the type combining a plurality of flat plates as illustrated in FIG. 4 (the tornado vane made by Sumitomo Jukikai Kogyo K.K.), and the type having two or more stirring vanes disposed without a break in the vertical direction as illustrated in FIG. 5 (the full zone vane made by Shinko Pantec K.K. and the Hi-F mixer made by Soken Kagaku K.K.). The type which has vanes disposed intermittently and yet substantially continuously may be embraced by the concept so long as it poses no problem concerning the stirring force. As concrete examples of the agitator, the pitched paddle type having paddle vanes disposed intermittently as illustrated in FIG. 6, the type using a vane furnished therein with cuts intended to impart increase stirring force to the vane as illustrated in FIG. 7 (like the product of Sumitomo Jukikai Kogyo K.K. and sold under the trademark designation of "Max Blend"), the screw type, the helical ribbon type, the large-width paddle type, the anchor type, the pitched paddle type, the horse-shoe type, the gate type, the multistage paddle vane, the single ribbon screw vane, the double ribbon screw vane, the cone type, the disc turbine type, the fan turbine type, the pitched turbine type, the hydrofoil type, the curved vane fan turbine type, the arrow feather turbine type, the Fadler type, the full margin type, the propeller type, and the reciprocating roll type vane may be cited in addition to the types illustrated above. These agitators may be properly used as varied with the viscosity of the reaction solution to be used and with the scale of production. These agitators may be given various modifications so long as the effects of this invention are not prevented. Commercially available agitators such as, for example, the products of Satake Kagakukikai K.K. sold under the trademark designations of "SUPERMIX HR-100, HR-320, and HR-500i", the product of Mitsubishi Jukgyo K.K. sold under the trademark designation of "SAMMELER", the product of Mitsubishi Jukogyo K.K. sold under the product code of "VCR," the product of Hakko Sangyo K.K. sold under the trademark designation of "BENDLEAF", the product of Sumitomo Jukikai Kogyo K.K. sold under the trademark designation of "SUPER BLEND", the product of Shinko Pantec K.K. sold under the trademark designation object of "LOGHOON", the product of Hitachi, Ltd. sold under the trademark designation of "NEJIRIKOSHI YOKU", and the product of Kansai Kagaku Kikai Seisaku, Ltd. sold under the trademark designation of "WALL WETTER" may be used.

The agitator, for the purpose of uniformly stirring the reaction solution, is preferred to have the axis of rotation thereof at the center of the agitating reaction vessel. The size of the vane cannot be uniquely decided but may be properly selected, depending on the kind of the agitator, the size of the agitating reaction vessel, and the kind of the compound used for the reaction. The radius of rotation of the vane is properly selected in the approximate range of 30~90% of the radius of the agitating reaction vessel. The site for the installation of the vane(s), for the sake of coping with various reaction conditions, is preferred to fall in the range extending from the neighborhood of the bottom part of the agitating reaction vessel through the neighborhood of the lid. Actually, when the quantity of the reaction solution supplied is fixed, the position for the installation of the vane(s) can be limited, depending on the fixed quantity.

The agitating reaction vessel and the agitator can be made of a varying metal material such as, for example, stainless steel. They may be subjected to a treatment for improvement of quality such as, for example, a surface finish which resorts to glass lining and electrolytic polishing.

The agitating reaction vessel is preferred to be furnished with supply means intended to supply an alkylene oxide gradually to the reaction solution. Though the supply means does not need to be particularly restricted, it is preferred to feed the reaction solution in the form of shower from the upper part of the agitating reaction vessel with a view to enhancing the efficiency of the absorption of the alkylene oxide into the liquid phase.

Further, the agitating reaction vessel is preferred to be furnished with bubbling means to deodorize the product formed through the alkylene oxide addition (alkoxylated compound) with an inert gas. This bubbling with the inert gas permits effective removal of impurities from the reaction solution and allows production of an alkoxylated compound having only a slight quantity of impurities and sparing odor. When a polyalkylene ($C_2$–$C_4$) imine is used as the active hydrogen-containing compound, since the reaction involving this compound is liable to by-produce impurities, it is strongly desired to remove these impurities by a step of deodorization. Argon, nitrogen, helium, carbon dioxide, or mixture thereof may be cited as concrete examples of the inert gas to be used for the bubbling. For the purpose of performing the bubbling treatment effectively, it is proper to provide the path for the reaction solution with two or more inert gas outlets directed toward the reaction solution and supply the inert gas to the reaction solution. The bubbles are preferred to have as small a size as permissible. Specifically, the nozzle for the supply of the bubbles is preferred to have a diameter of not more than 40 mm, more preferred to have a diameter of not more than 30 mm. For the supply of the inert gas, the agitating reaction vessel is preferred to be provided in the interior thereof with supply means. An annular inert gas supply means furnished with gas outlets may be disposed as immersed in the reaction solution. The impurities in the reaction solution may be removed by simple distillation, thin-film distillation, or spray drier treatment in the place of or in combination with the bubbling treatment mentioned above. The simple distillation means batch distillation which uses no part for rectification and can be implemented with an ordinary device. The thin-film distillation can be carried out by using a Hickman type distilling device, a falling-film type distilling device, a rotor tray type distilling device, or a brush type molecular distilling device, for example. Properly, the distillation is performed under the conditions of not more than 0.1 mmHg in pressure and 100~200° C. in temperature. The spray drier treatment can be performed by spraying a target substance from above and blowing a hot inert gas of a temperature of 100~200° C. from below. In this case, since the target substance is dried in a granular form, it is made possible to enlarge the surface area for evaporation, shorten the time for contact of the liquid drops with the hot gas, and allay the degradation of the target compound by heat load. As other concrete examples of the means of deodorization, activated carbon, molecular sieve, porous polymer, and zeolite may be cited. When this particular means is used for effecting the deodorization, the fact that the waste arising from using the relevant material requires an after treatment ought to be taken into consideration.

To the agitating reaction vessel, component elements other than those mentioned above may be added. With a view to heightening the stirring force, for example, the agitating reaction vessel may be provided along the lateral face thereof with a baffle plate or with a cooling coil. While the cooling coil causes a decrease in the stirring force, this trouble can be solved by adopting the method of this invention.

Now, the conditions for the production of the alkoxylated compound of this invention will be described in detail below.

The active hydrogen-containing compound does not need to be particularly restricted but is only required to be capable of reacting with an alkylene oxide. As concrete examples of the active hydrogen-containing compound, such compounds as contain an amino group, a hydroxy group, or a carboxyl group may be cited. As compounds particularly effective in executing this invention, polyalkylene ($C_2$–$C_4$) imines, polyalkylene ($C_2$–$C_4$) glycols, alcohols having an unsaturated bond, and polyhydric alcohols may be cited. As concrete examples of the polyalkylene ($C_2$–$C_4$) imines, polyethylene imine, polypropylene imine, polybutylene imine, polyisopropylene imine, and polyisobutylene imine may be cited. Polyethylene imine proves preferable over the other polyalkylene ($C_2$–$C_4$) imines in consideration of the production cost. As concrete examples of the polyalkylene ($C_2$–$C_4$) glycols, polyethylene glycol, polypropylene glycol, polybutylene glycol, polyisopropylene glycol, and polyisobutylene glycol may be cited. Among other polyalkylene ($C_2$–$C_4$) glycols mentioned above, polyethylene glycol is particularly preferable in view of the production cost. The weight average molecular weight of such a polymer does not need to be particularly restricted. If the molecular weight is unduly low, the shortage will be possibly at a disadvantage in preventing the polymer from acquiring the quality inherent in the polymer. If the molecular weight is unduly high, the excess will be possibly at a disadvantage in increasing the viscosity to the extent of inconveniencing the handling. From this point of view, the weight average molecular weight is properly not less than 300 and preferably not less than 600. The upper limit of the weight average molecular weight is preferably not more than 2,000,000, more preferably not more than 500,000, still more preferably not more than 10,000, and particularly preferably not more than 5,000. The polymer may be in a linear form or a branched form; whichever better fits the occasion. As alcohols having an unsaturated bond, alkenyl group-containing hydroxy compounds, and methacryl alcohol may be cited. The alkenyl group-containing hydroxy compound does not need to be particularly restricted. As concrete examples of this compound, unsaturated alcohols such as allyl alcohol, methallyl alcohol, 3-buten-1-ol, 2-methyl-2-buten-1-ol, 2-methyl-3-buten-1-ol, 3-methyl-3-buten-1-ol, 3-methyl-2-buten-1-ol, and 2-methyl-3-buten-2-ol and alkoxylated compounds formed by adding about 1~25 mols of an alkylene oxide which will be described more specifically herein below to such unsaturated alcohols may be cited. These alkenyl group-containing hydroxy compounds may be used either singly or in the form of a combination of two or more members. Where the average number of mols of an alkylene oxide added to an active hydrogen-containing compound is expected to be not less than 40, it is preferable to use as the alkenyl group-containing hydroxy compound an alkoxylated compound produced by the addition of an alkylene oxide to an unsaturated alcohol and effect the addition of the alkylene oxide by a multistage process. As concrete examples of the polyhydric alcohol, sorbitol and glycerin may be cited.

Active hydrogen-containing compounds can be prepared and purified by a varying known method. Otherwise, such compounds which are commercially produced (for example, the products of Nippon Shokubai Co., Ltd. sold under the trademark designations of "Epomine SP-018 and SP-006") are usable.

Properly such an active hydrogen-containing compound is supplied to the agitating reaction vessel and stirred therein before the supply of an alkylene oxide. The way of the supply of the active hydrogen-containing compound to the agitating reaction vessel does not need to be restricted to the prescribed way. Only a consideration generally expected of compounds in general is required. Though the quantity of the active hydrogen-containing compound to be supplied cannot be uniquely defined because it is decided by the inner volume of the agitating reaction vessel and the kind of compound to be used, it is properly in the approximate range of 5~50 vol. % based on the inner volume of the agitating reaction vessel. The active hydrogen-containing compound may be supplied singly or, as occasion demands, may be supplied in combination with such a solvent as water or acetone. When it is added together with a solvent, however, due attention ought to be paid to the possibility that the reaction of this compound with the active hydrogen in the solvent causes by-production of impurities. In consideration of the solubility of the alkylene oxide present in the gas phase into the liquid phase and the equilibrium of distribution, the solution containing the active hydrogen-containing compound is preferred to have a small difference in polarity from the alkylene oxide to be supplied.

The alkylene oxide which can be used in the method of this invention does not need to be particularly restricted, alkylene oxides having 2~4 carbon atoms are properly used. As concrete examples of such alkylene oxides, ethylene oxide, propylene oxide, butylene oxide, isopropylene oxide, and isobutylene oxide may be cited. Among other alkylene oxides mentioned above, ethylene oxide and propylene oxide prove advantageous and ethylene oxide proves particularly advantageous from the viewpoint of the cost of production. The alkylene oxides enumerated above may be used either singly or in the form of a combination of two or more members. The use may be made in any of various known modes such as random addition, block addition, and alternating addition. When the alkoxylated compound is used as the raw material for a cement dispersing agent, it is preferred to contain at least ethylene oxide. Properly in this case, the ratio of ethylene oxide to the total alkylene oxide is in the range of 50~100 mol %. If the proportion of ethylene oxide falls short of 50 mol %, the polymer produced from the alkoxylated compound and used for the cement dispersing agent will tend to incur degradation of the water reducing property. The ratio of ethylene oxide to the total alkylene oxide is preferably not less than 60 mol %, more preferably not less than 70 mol %, still more preferably not less than 80 mol %, and most preferably not less than 90 mol %. Optionally, such an epoxide-containing compound as glycidol or epichlorohydrin may be used in the place of the alkylene oxide.

As concrete examples of the method for supplying the alkylene oxide, the method which comprises showering a target compound with the alkylene oxide as mentioned above and the method which comprises providing the lid or the upper part of the inner wall of the agitating reaction vessel with outlets for injection of the alkylene oxide may be cited. The quantity of the alkylene oxide to be supplied is uniquely defined with difficulty because it varies with the kind of the product aimed at. Generally, it is so supplied that the ratio of the total quantity (mol) of the alkylene oxide to be supplied to the quantity (mol) of the active hydrogen group in the active hydrogen-containing compound (Alkylene oxide/Active hydrogen group) may be in the approximate range of 0.5~200. Typically, the formation of by-product tends to increase in accordance as the quantity of the alkylen oxide to be added increases. In view of this fact, it is inferred that the effect in efficiently repressing the formation of the by-product induced by this invention is beneficial proportionately to the increase in the number of mols of added alkylene oxide. To be specific, this invention is beneficial when the average number of mols of alkylene oxide added is not less than 40, more beneficial when the average number is not less than 45, still more beneficial when the average number is not less than 60, particularly beneficial when the average number is not less than 90, and most beneficial when the average number is not less than 110.

The proper speed of supply of the alkylene oxide is uniquely defined with difficulty because it varies with the kind of reaction system and the kind of agitating reaction vessel. It suffices to effect this supply so that the pressure of the gas phase may not surpass the prescribed level. To be specific, it is proper to make this supply so that the pressure may be in the approximate range of 0.5~10 kg/cm$^2$.

In performing the alkylene oxide addition reaction, it is commendable to use as the catalyst for the reaction one member or a combination of two ore more members selected from among alkali metals, alkaline earth metals, and hydroxides thereof. As concrete examples of the catalyst, sodium, sodium amalgam, sodium halides, sodium methoxide, potassium, potassium amalgam, potassium halides, potassium methoxide, sodium hydroxide, and potassium hydroxide may be cited.

As concrete examples of the alkoxylated compound which is obtained by the method of this invention, polyamine polyether polyol polymers resulting from the addition of alkylene oxides to polyalkylene imine, ethylene oxide adduct of isoprenol, alkylene oxide adduct of polyethylene glycol, and alkylene oxide adducts of alkenyl group-containing hydroxy compounds may be cited. The alkoxylated compound may have either a hydrogen atom or a hydrocarbon group derived from the hydrogen atom by subsequent alkylation at the terminal area of the added alkylene oxide. The hydrocarbon group is preferred to be selected from among hydrocarbon groups of 1~30 carbon atoms. As concrete examples of the hydrocarbon group, aliphatic or alicyclic alkyl groups, and aromatic groups possessing such benzene rings as phenyl group, alkylphenyl groups, phenylalkyl groups, phenyl groups substituted with alkylphenyl groups, and naphthyl group may be cited.

The stirring power of the agitator during the course of the reaction cannot be uniquely defined because it is the numerical value to be properly selected, depending on the type of the agitator, the kind of the alkylene oxide to be added, and the kind of the active hydrogen-containing compound. Generally, from the viewpoint of precluding the occurrence of an uneven reaction and the degradation of the speed of reaction owing to the defective stirring, the stirring power is properly in the range of 0.2~3 kW/m$^3$ and more properly in the range of 0.5~2.5 kW/m$^3$. The stirring power does not need to be maintained at a fixed level but may be varied with the reaction conditions.

The reaction temperature, the reaction pressure, and the method of reaction may be properly selected, depending on the kind of final product to be expected and the purity and yield aimed at. As respects the reaction temperature, the solubility of the alkylene oxide in the reaction solution tends to decrease in accordance as the temperature rises. Thus, the present invention is beneficial when the temperature of the reaction solution must be not lower than 100° C., more beneficial when the temperature must be not lower than 120° C., and particularly beneficial when the temperature must be not lower than 140° C. This expression, however, is not meant to exclude the application of this invention to the conditions having a low reaction temperature. The atmosphere in the agitating reaction vessel during the course of reaction may be controlled to allow the alkylene oxide gas to occupy the greater part of the atmospheric gas by decompressing the atmosphere and introducing alkylene oxide. For the purpose of lowering the explosiveness of the alkylene oxide, the supply of the alkylene oxide to the atmospheric gas may be started after the atmospheric gas has been displaced with such an inert gas as nitrogen or argon.

When the active hydrogen-containing compound to which the alkylene oxide is added happens to be an alkenyl group-containing hydroxy compound, it is proper for the alkylene oxide addition reaction to proceed under the conditions satisfying the following formula (3):

$$\text{Numerical Value } J=300+0.033X^2Y-6.5XY+300Z+330Y<1900 \quad (3)$$

By causing the alkylene oxide addition reaction to proceed under these conditions, it is made possible to repress the quantity of the by-product which is formed in consequence of the production of the alkoxylated compound. This effect is beneficial when the average number of mols of alkylene oxide is not less than 40, more beneficial when the average number is not less than 45, and still more beneficial when the average number is not less than 60, particularly beneficial when the average number is not less than 90, and most beneficial when the average number is not less than 110 as mentioned above. In the formula, X denotes the reaction temperature (° C.), Y denotes the reaction time (time for the introduction of alkylene oxide (hr)+time for aging (hr)), and Z denotes the concentration of the catalyst (mass % of the catalyst relative to the theoretical quantity of the alkoxylated compound calculated from the quantities of the raw materials to be charged).

The reaction temperature (X) expresses the temperature of the alkylene oxide addition reaction and can be obtained by measuring the temperature of the reaction solution. When the reaction temperature varies during the course of the alkylene oxide addition reaction, the average temperature is used as the reaction temperature involved in the formula (3) mentioned above. The average temperature is calculated from the temperatures measured at intervals of one minute, for example. Though the reaction temperature (X) is only required to be set so as to satisfy the formula (3) mentioned above, it is preferably in the range of 80~155° C., more preferably in the range of 90~140° C., and still more preferably in the range of 100~130° C. If the reaction temperature (X) is unduly high, the occurrence of the polyalkylene oxide as a by-product will tend to increase and the polymer obtained from the produced alkoxylated compound and used for the cement dispersing agent, for example, will tend to incur a decline in the water reducing property. Conversely, if the reaction temperature (X) is unduly low, the shortage will lower the speed of addition and cause a decline in the productivity.

The reaction time (Y) expresses the total of the time required for the introduction of the alkylene oxide and the time required for the aging. When the addition reaction is performed by continuously introducing the alkylene oxide mentioned above into the mixture of the alkenyl group-containing hydroxy compound and the catalyst, for example, this reaction time (Y) constitutes the total of the time during which the alkylene oxide is introduced and the time required for aging the reaction solution till completion. The reaction time (Y) is required to be controlled so as to satisfy the formula (3) mentioned above. It is properly within 50 hours, more properly within 40 hours, and still more properly within 30 hours. If the reaction time (Y) is unduly long, the quantity of the by-product to be formed will tend to increase.

The concentration of the catalyst (Z) expresses the ratio of mass of the catalyst to the theoretical quantity of the alkoxylated compound calculated from the quantities of the raw materials charged. Though this concentration is only required to be set so as to satisfy the formula (3), it is properly not more than 10,000 ppm, more properly not more than 8,000 ppm, still more properly not more than 5,000 ppm, and most properly not more than 3,000 ppm. If the concentration of the catalyst is unduly high, the excess will tend to induce occurrence of the by-product in a large quantity.

By preparing the alkoxylated compound under the conditions satisfying the formula (3), it is made possible to repress effectively the formation of the by-product. The quantity of the polyalkylene oxide to be by-produced in consequence of the alkylene oxide addition reaction is properly not more than 15 mass %, more properly not more than 13 mass %, and still more properly not more than 10 mass %, based on the total product obtained by the addition reaction. If the quantity of the by-produced polyalkylene oxide is larger than the ratio mentioned above, the excess will possibly degrade the characteristic properties of the alkoxylated compound obtained. For example, when the polymer for use in the cement dispersing agent is obtained by using so produced alkoxylated compound, the properties of the polymer such as the water reducing property will tend to decline. The quantity of the polyalkylene oxide formed can be measured by any of the methods in common use. The quantity of the polyethylene glycol, for example, can be measured by the method which will be described in the working examples cited herein below.

Isoprene may be formed as by-product during the course of the alkylene oxide addition reaction. Such formation of isoprene may be repressed by the method of the present invention. The quantity of the isoprene is properly not more than 1,000 ppm, more properly not more than 900 ppm, still more properly not more than 800 ppm, the most properly not more than 700 ppm. The quantity of isoprene, for example, can be measured by the method which will be described in the working examples cited herein below.

Now, the reaction to be employed in obtaining a polyamine polyether polyol polymer by using polyethylene imine as an active hydrogen-containing compound will be described below as one mode of embodying this invention.

First, polyethylene imine is supplied to an agitating reaction vessel. The quantity in the range of 0.85~1.05 mols of ethylene oxide and/or propylene oxide per mol of the NH bond contained in the polyethylene imine is caused in its unmodified form or, when necessary, as diluted with a solvent to react in accordance with the method described herein with the polyethylene imine. The addition of ethylene oxide and/or propylene oxide may be carried out in the presence of a solvent or in the absence of a solvent. Properly, the pressure during the course of the reaction is in the approximate range of 2.0~4.2 $kg/cm^2$.

Next, a catalyst such as NaOH, KOH, or $NaOCH_3$ is added into the system. The catalyst may be added either in its unmodified form or as dissolved in water or methanol. If the quantity of the catalyst is unduly small, the rate of reaction will be possibly lowered. If the quantity is unduly large, the quantity of impurities to be formed will be possibly increased. Further, from the viewpoint of repressing the formation of impurities, KOH is used most properly as the catalyst.

When the catalyst has been added with the aid of a solvent, the catalyst is vaporized by deaeration and/or application of heat and subsequently ethylene oxide and/or propylene oxide is caused either in its unmodified form or, when necessary, as diluted with a solvent to react in accordance with the method described herein at a temperature in the range of 100~200° C., preferably in the range of 150~175° C. Properly, the pressure during the course of the reaction is in the approximate range of 2.5~8 $kg/cm^2$. By performing this addition of alkylene oxide as divided into two stages, it is made possible to prevent the occurrence of impurities and the coloration advantageously.

After the addition of alkylene oxide is completed, the produced adduct is left aging at a temperature in the approximate range of 100~170° C. for a period in the range of 0~3 hours and, with the aim of neutralizing the catalyst, treated with a carboxylic acid of 2~6 carbon atoms [such as $CH_3COOH$, $CH_3CH_2COOH$, $(CH_3)_2CHCOOH$, and $CH_3CH(OH)COOH$], phosphoric acid, hydrochloric acid, or sulfuric acid at a temperature in the approximate range of 40~60° C.

Subsequently, the product of the addition reaction is deodorized by being ventilated with such an inert gas as nitrogen or argon. The deodorization, when necessary, may be effected by adding water or such a volatile solvent as ethanol to the polyamine polyether polyol polymer at a rate in the range of 1~10 mass % based on the total mass of the polymer and decompressing the resultant mixture to a level in the range of 0~0.01 MPa at a temperature in the range of 100~170° C. These two measures maybe implemented jointly. For example, the deodorization may be attained by decompressing the mixture by means of water to a level in the range of 0~0.005 MPa and meanwhile ventilating it with nitrogen. The deodorizing time is properly in the range of 1~8 hours and more properly in the range of 3~5 hours.

The polyamine polyether polyol polymer may be further modified or cross-linked with a monomer or polymer possessing such a reactive substituent as a primary—tertiary amino group and a hydroxyl group. As concrete examples of the modification, quaternization with an epoxy group or isocyanate group, carboxylic anhydride, aziridine group, epichlorohydrin, or an alkylchloride, esterification or amidation with a carboxylic acid, and Michael addition with an unsaturated monomer may be cited. As concrete examples of the compound used, such carboxylic acid-containing monomer as (meth)acrylic acid and maleic acid; such unsaturated bond-containing compound as (math)acrylic acid ester of 1~20 carbon atoms and alkyl allyl ester of 1~20 carbon atoms; (meth)acrylic acid chloride, glycidyl (meth)acrylate, methylene chloride, dimethyl sulfate, diethyl sulfate, such isocyanates as toluylene di-isocyanate may be cited.

The application of the polyamine polyether polyol polymer obtained as described above does not need to be particularly restricted. As concrete examples of the application which is found for this polymer, lubricants, cutting oils, viscosity index enhancers, fluidizing agents, slip additives, water and oil paints, paper reagents, inorganic and organic dispersing agent for silica and carbon black, emulsifiers, emulsion polymerization grade activating agents, gelling agents, viscosity adjusting agents, liquid, gel, or solid detergent compositions (dispersants and builders), coagulating agents, water or oil ink compositions, ink jet printer grade ink compositions, antistatic additives, solid electrolytes, antibleeding agents, and dyestuffs may be cited.

When an alkenyl group-containing hydroxy compound is used as the active hydrogen-containing compound, the alkoxylated compound consequently produced can be suitably used in obtaining polycarboxylic acid for use in cement additives. In this case, an unsaturated dicarboxylic acid or an ester thereof, an unsaturated sulfonic acid, unsaturated amide, a vinyl ester, or an aromatic vinyl compound is copolymerized with the alkoxylated compound. Since the alkoxylated compound produced by the method of this invention contains impurities only in a small quantity, the polycarboxylic acid produced for use in cement additives manifests an excellent effect in such properties as the water reducing ability. Now, one example of using the alkoxylated compound as the raw material for the polycarboxylic acid to be used in cement additives will be explained below. It should be noted, however, that the application of the compound is not limited to the following application.

The cement additives grade polycarboxylic acid is obtained by copolymerizing an alkoxylated compound (A) synthesized from an alkenyl group-containing hydroxy compound, an unsaturated carboxylic acid (B), and, as an optional additive, other monomer (C) copolymerizable with the component (A) or (B).

As concrete examples of the unsaturated carboxylic acid (B), (meth)acrylic acid, crotonic acid, maleic acid, fumaric acid, itaconic acid, and monovalent metal salts (lithium salt, sodium salt, and potassium salt), divalent metal salts (calcium salt and magnesium salt), ammonium salts, and organic amine salts (ethanol amine salt, diethanol amine salt, and triethyl amine salt) thereof; half esters of maleic acid, fumaric acid, and itaconic acid with alcohols of 1~22 carbon atoms; and half amides of half esters of glycols of 2~4 carbon atoms with amines of 1~22 carbon atom may be cited.

As concrete examples of the other monomer (C), styrenes such as styrene, bromostyrene, chlorostyrene, and methyl styrene; dienes such as 1,3-butadiene, isoprene, and isobutylene; (meth)acrylic esters such as methyl (meth)acrylate, ethyl (meth)acrylate, butyl (meth)acrylate, pentyl (meth) acrylate, hexyl (meth)acrylate, decyl (meth)acrylate, and lauryl (meth)acrylate; esters of alkoxy(poly)alkylene glycols resulting from adding 1~500 mols of alkylene oxides of 2~18 carbon atoms to alcohols of 1–30 carbon atoms with unsaturated monocarboxylic acids such as (meth)acrylic acids; adducts resulting from adding 1~500 mols of alkylene oxides of 2~18 carbon atoms to unsaturated monocarboxylates such as (poly)ethylene glycol monomethacrylate, (poly)-propylene glycol monomethacrylate, and (poly) butylene glycol monomethacrylate; .-olefins such as hexene, heptene, and decene; alkyl vinyl ethers such as methyl vinyl ether, ethyl vinyl ether, and butyl vinyl ester; vinyl esters such as vinyl acetate; allyl esters such as allyl acetate; bifunctional (meth)acrylates such as hexane diol di(meth) acrylate and monovalent metal salts, bivalent metal salts, ammonium salts, and organic amine salts thereof; unsaturated sulfonates such as vinyl sulfonate, (meth)allyl sulfonate, and styrene sulfonate and monovalent metal salts, bivalent metal salts, ammonium salts, and organic amine salts thereof; unsaturated amides such as (meth)acryl amide; allyls such as allyl alcohol; unsaturated amino compounds such as dimethyl aminoethyl (meth)acrylate; and vinyl ethers or ally ethers such as methoxypolyethylene glycol monovinyl ether, polyethylene glycol monovinyl ether, methoxypolyethylene glycol mono(meth)allyl ether, and polyethylene glycol mono(meth)allyl ether may be cited.

The ratio of the alkoxylated compound (A)/the unsaturated carboxylic acid (B) mentioned above/the other monomer (C) mentioned above is properly set in the range of 1~99/1~99/0~90 (ratio by mass), more properly in the range of 5~99/2~80/0~50 (ratio by mass), and still more properly in the range of 10~95/2~50/0~25 (ratio by mass).

The method for copolymerizing the components (A), (B), and optionally (C) does not need to be particularly restricted. The copolymerization may be carried out by a known method such as, for example, solution polymerization or bulk polymerization using a polymerization initiator. The copolymerization may be carried out either batch process or continuous process.

The polymerization initiator mentioned above does not need to be particularly restricted. As concrete examples of the polymerization initiator to be used effectively herein, persulfates such as ammonium persulfate and sodium persulfate; hydrogen peroxide; azo compounds such as azo-bis-2-methylpropion amidine hydrochloride and azoisobutylonitrile; and peroxides such as benzoyl peroxide may be cited. The polymerization initiator may be used in combination with a promoter. As concrete examples of the promoter which is effectively usable herein, such reducing agents as sodium hydrogen sulfite, sodium sulfite, Mohr's salt, and ascorbic acid may be cited. Further, during the course of the copolymerization, such a chain transfer agent as, for example, mercapto propionic acid, dodecyl mercaptan, or decane thiol may be used as occasion demands. These polymerization initiators, promoters, and chain transfer agents cited above may be used either singly or in the form of a combination of two or more members.

In the copolymerization mentioned above, a solvent may be used as occasion demands. The solvent effectively usable herein does not need to be particularly restricted. As concrete examples of the solvent, water; alcohols such as methyl alcohol, ethyl alcohol, and isopropyl alcohol; aromatic or aliphatic hydrocarbons such as benzene, toluene, xylene, cyclohexane, and n-heptane; esters such as ethyl acetate; and ketones such as acetone and methylethyl ketone may be cited. These solvents may be used either singly or in the form of a combination of two or more members.

The cement additives grade polycarboxylic acid obtained as described above has a weight average molecular weight which is in the range of 3,000~200,000, preferably in the range of 5,000~100,000, and more preferably in the range of 10,000~80,000.

The polycarboxylic acid obtained by using the alkoxylated compound of this invention is used as an active component for such inorganic substance dispersants as a cement dispersing agent and for thickeners, particularly suitably as the cement dispersing agent. At this time, the polycarboxylic acid mentioned above can be used in the form of a simple substance, a mixture, or an aqueous solution directly used as the cement dispersing agent. It may be otherwise used as combined with other known cement additives. As concrete examples of the known cement additives, the conventional cement dispersing agent, air entraining agent, cement wetting agent, inflating agent, waterproofing agent, retarding agent, accelerator, water-soluble macromolecular compounds, thickener, coagulating agent, strength enhancer, hardening promoter, and defoaming agent may be cited.

The cement dispersing agent which has the aforementioned polycarboxylic acid as an indispensable additive can be used for hydraulic cements such as Portland cement, alumina cement, cement of high belite content, and various mixed cements and hydraulic materials other than cement such as gypsum, for example. The fine aggregate and the coarse aggregate which can be incorporated in the cement composition do not need to be particularly restricted but may be properly selected from among various kinds of fine aggregate and coarse aggregate which are now in popular use. The quantities of the fine aggregate and the coarse aggregate to be incorporated in the cement composition do not need to be particularly restricted but may be properly fixed, depending on the materials to be used.

The ratio of the cement dispersing agent in the cement composition using the cement dispersing agent, namely the composition containing at least cement, water, and the cement dispersing agent, is in the range of 0.01~1.0 mass %, preferably in the range of 0.02~0.5 mass %, based on the mass of the solid component of cement. The cement composition prepared by incorporating the cement dispersing agent in a ratio falling in the range defined above enjoys various favorable effects such as decreasing the quantity of water required, increasing the strength of concrete, and improving the durability of mortar or concrete in addition to conspicuously exalting the slump retaining time.

Experiments

This invention will be described more specifically below with reference to working examples cited herein below. It should be noted that this invention is not limited thereto. The quantities of polyethylene glycol, isoprene, and 2,3-butanedione formed, the weight average molecular weight of polycarboxylic acid, etc. which are indicated in the examples were determined under the following conditions.

(Quantity of Polyethylene Glycol Formed)

Column: Product of Shodex sold under trademark designation of "LC Column GF-310" (400 mm in length)
Eluant: Water
Flow rate: 1 ml/min.
Standard substance: Polyethylene glycol (weight average molecular weight 1,000)
Sensor: R1

(Quantities of Isoprene and 2,3-butanedione Formed)

A given sample was heated in a head space (product of TEKMER) at 80° C. for 10 minutes and subjected to quantitative determination with an instrument produced by GL Science Corp. and sold under the product code of "GC353."

Column: Product of J&W Scientific Corp. sold under the product code of "DB-1 (length 300 mm)"
Sensor: FID (Weight Average Molecular Weight of Polycarboxylic Acid)

Column: Products of Tosoh K.K. sold under the trademark designations of "TSK guard column SWXL"+"TSK gel G4000 SWXL"+"TSK gel G3000 SWXL"+"TSK gel G2000 SWXL"
Eluant: A solution prepared by dissolving 115.6 g of sodium acetate trihydrate in a mixed solvent formed of 10,999 g of water and 6,001 g of acetonitrile and adjusting the resultant solution with an aqueous 30% solution of sodium hydroxide to pH 6.0.
Flow rate: 0.8 ml/sec.
Column temperature: 35° C.
Standard substance: Polyethylene glycol (weight average molecular weight 272,500, 219,300, 85,000, 46,000, 24,000, 12,600, 7,100, 4,250, 1,470)
Sensor: Differential refraction sensor made by Nippon Waters K.K.
Software for analysis: "MILLENNIUM ver. 2.18" made by Nippon Waters K.K.

EXAMPLE 1

An unsaturated alcohol formed by adding an average of 10 mols of ethylene oxide to an active hydrogen-containing compound (3-methyl-3-buten-1-ol) (occasionally referred to hereinafter as "IPN-10": viscosity 15 mPa·s (120° C.)) was supplied in a volume of 2.3 m$^3$ to an agitating reaction vessel provided with a tornado type agitator illustrated in FIG. 4 (product of Sumitomo Jukiki Kogyo K.K. sold under the trademark designation of "Max Blend"). The reaction vessel was further charged with 5.4 kg of sodium hydroxide as a catalyst. With the reactants in the reaction vessel kept stirred, the interior of the reaction vessel was displaced with nitrogen and heated under the atmosphere of nitrogen to 120° C. The catalyst concentration relative to the theoretical quantity of alkoxylated compound calculated from the quantities of raw materials initially charged was 0.05 mass %. Ethylene oxide was supplied in a total volume of 7.5 m$^3$ over a period of 15 hours with retaining the concentration in the gas phase part at 45 vol. %. The reaction temperature was 120° C. and the viscosity of the reaction solution containing the unsaturated alcohol added an average of 50 mols of ethylene oxide to the isoprenol (hereinafter occasionally referred to as "IPN-50") was 56 mPa·s (120° C.). The stirring power during the course of the reaction was set at 1 kW/m$^3$. In the present example, the vane was constantly present in the gas-liquid interface during the course of production. That is, the numerical value C in the formula (1) mentioned above was 1. The numerical value J in the formula (3) mentioned above was 693. The conditions and the results were as shown in Table 1. The coloration was compared by using APHA and the Gardner color scale (which applies similarly hereinafter).

EXAMPLE 2

Ethylene oxide addition was carried out by following the procedure of Example 1 while using an agitating reaction vessel provided with a Max Blend agitator illustrated in FIG. 7 instead. The time required for the production was 7 hours. The vane was constantly present in the gas-liquid interface during the course of production; thus the numerical value C in the formula (1) mentioned above was 1. The numerical value J in the formula (3) mentioned above was 693. The conditions and the results were as shown in Table 1.

COMPARATIVE EXAMPLE 1

Ethylene oxide addition was carried out by following the procedure of Example 1 while using an agitating reaction vessel provided with five 45° inclination paddles instead. The time required for the production was 70 hours. When the numerical value C in the formula (1) mentioned above was calculated from the heights of liquid level before and after the production, it was found to be 0.11. The numerical value J in the formula (3) mentioned above was 2079. The conditions and the results were as shown in Table 1.

EXAMPLE 3

Addition of ethylene oxide to polyethylene glycol (PEG) was carried out by following the procedure of Example 1 while using an agitating reaction vessel provided with a full zone agitator illustrated in FIG. 5 instead. The viscosity of the reaction solution and the conditions such as addition temperature were as shown in Table 1. The vane was constantly present in the gas-liquid interphase during the course of production and the numerical value C in the formula (1) mentioned above was 1. The time required for the production was 8 hours. The results were as shown in Table 1.

COMPARATIVE EXAMPLE 2

Addition of ethylene oxide to polyethylene glycol (PEG) was carried out by following the procedure of Example 3 while using an agitating reaction vessel provided with five inclination paddle vanes (angle of inclination: 45° at the lowermost part and 90° at the other parts) instead. The viscosity of the reaction solution and the conditions such as addition temperature were as shown in Table 1. When the numerical value C of the formula (1) mentioned above was calculated from the heights of liquid level before and after the production, it was found to be 0.257. The time required for the production was 12 hours. The results were as shown in Table 1.

EXAMPLE 4

Addition of ethylene oxide to polyethylene imine (made by Nippon Shokubai Co., Ltd. and sold under the product code of "SP-006": hereinafter occasionally referred to as "PEI-6") was carried out by following the procedure of Example 1 while using an agitating reaction vessel provided with a Max Blend agitator illustrated in FIG. 7 instead. The viscosity of the reaction solution and the conditions such as addition temperature were as shown in Table 1. The vane was constantly present in the gas-liquid interface during the course of production and the numerical value C in the formula (1) mentioned above was 1. The time required for the production was 8 hours. The results were as shown in Table 1.

COMPARATIVE EXAMPLE 3

Addition of ethylene oxide to polyethylene imine was carried out by following the procedure of Example 4 while using an agitating reaction vessel provided with five 45° inclination paddle vanes instead. The viscosity of the reaction solution and the conditions such as addition temperature were as shown in Table 1. When the numerical value C in the formula (1) mentioned above was calculated from the heights of liquid level before and after the production, it was found to be 0.42. The time required for the production was 15 hours. The results were as shown in Table 1.

EXAMPLE 5

Addition of ethylene oxide to polyethylene imine (made by Nippon Shokubai Co., Ltd. and sold under the product code of "SP-018": hereinafter occasionally referred to as "PEI-18") was carried out by following the procedure of Example 1 while using an agitating reaction vessel provided with a Max Blend agitator illustrated in FIG. 7 instead. The viscosity of the reaction solution and the conditions such as addition temperature were as shown in Table 1. The vane was constantly present in the gas-liquid interface during the course of production and the numerical value C in the formula (1) mentioned above was 1. The time required for the production was 12 hours. The results were as shown in Table 1.

COMPARATIVE EXAMPLE 4

Addition of ethylene oxide to polyethylene imine was carried out by following the procedure of Example 5 while using an agitating reaction vessel provided with five 45° inclination paddle vanes instead. Though the reaction was continued, the addition could not last till the same quantity of ethylene oxide as in Example 5 and, therefore, was stopped halfway along the course of the addition. The viscosity of the reaction solution and the conditions such as addition temperature were as shown in Table 1. When the numerical value C in the formula (1) mentioned above was calculated based on the time of stopping the reaction taken as the time of completion, it was found to be 0.45.

TABLE 1

|  | Exam. 1 | Exam. 2 | Comp. Exam. 1 | Exam. 3 | Comp. Exam. 2 | Exam. 4 | Comp. Exam. 3 | Exam. 5 | Comp. Exam. 4 |
|---|---|---|---|---|---|---|---|---|---|
| Raw material |  |  |  |  |  |  |  |  |  |
| Kind | IPN-10 | IPN-10 | IPN-10 | PEG Mw5000S | PEG Mw3000 | PEI-6 | PEI-6 | PEI-18 | PEI-18 |
| Viscosity (mPa·s) | 15 | 15 | 15 | 70 | 70 | 130 | 130 | 850 | 850 |
| Catalyst Concentration (mass %) | 0.05 | 0.05 | 0.05 | 0.0093 | 0.0093 | 1.715 | 1.715 | 0.8624 | 0.8624 |
| Product |  |  |  |  |  |  |  |  |  |
| Kind | IPN-50 | IPN-50 | IPN-50 | PEG Mw15000 | PEG Mw15000 | PEI-6 + 3EO | PEI-6 + 3EO | PEI-18 + 3EO | PEI-18 + 3EO |
| Viscosity (mPa·s) | 56 | 56 | 56 | 1500 | 1500 | MAX1700 | MAX1700 | MAX4500 | MAX4500 |

TABLE 1-continued

|  | Exam. 1 | Exam. 2 | Comp. Exam. 1 | Exam. 3 | Comp. Exam. 2 | Exam. 4 | Comp. Exam. 3 | Exam. 5 | Comp. Exam. 4 |
|---|---|---|---|---|---|---|---|---|---|
| Conditions of Production | | | | | | | | | |
| Kind of agitator | Tornado | Max Blend | Five paddles | Full zone | Five paddles | Max Blend | Five paddles | Max Blend | Five paddles |
| Numerical value C | 1.00 | 1.00 | 0.11 | 1.00 | 0.257 | 1.00 | 0.42 | 1.00 | 0.45 |
| Stirring power (kW/m$^3$) | 1 | 1 | 1 | 2 | 2 | 2 | 2 | 2 | 2 |
| Reaction time (hr) | 15 | 15 | 70 | 8 | 12 | 8 | 15 | 12 | — |
| Addition temperature (° C.) | 120 | 120 | 120 | 150 | 150 | 150–165 | 150–165 | 150–165 | 150–165 |
| Scale of synthesis (m$^3$) | 10 | 10 | 10 | 12 | 12 | 35 | 35 | 25 | 25 |
| Height of liquid level/diameter of reaction vessel | 2.7 | 1.6 | 2.7 | 1.9 | 1.9 | 1.5 | 1.5 | 1.1 | 1.1 |
| Numerical value J | 693 | 693 | 2079 | — | — | — | — | — | — |
| Quantity of Impurities formed | | | | | | | | | |
| PEG (mass %) | 6.3 | 6.0 | 15.7 | — | — | 0.9 | 2.5 | 1.3 | — |
| Isoprene (ppm) | 665 | 600 | 1055 | — | — | — | — | — | — |
| 2,3-Butanedione (ppm) | — | — | — | — | — | 0 | 5 | 0 | — |
| Coloration | | | | | | | | | |
| APHA | 100 | 100 | 200 | 30 | 70 | — | — | — | — |
| Gardner color scale | — | — | — | — | — | 12 | 15 | 13 | — |
| Odor (o: No, x: Yes) | o | o | x | o | o | o | x | o | — |

As shown in Table 1, the application of the method of this invention was demonstrated to promote the addition reaction of alkylene oxide, improve the productivity, and decrease the quantity of impurities by-produced.

The relation between the numerical value J defined by the formula (3) mentioned above and the quantity of impurities formed will be explained below with reference to the following working examples.

EXAMPLE 6

An agitating reaction vessel (made by Sumitomo Jukiki Kogyo K.K. and sold under the trademark designation of "Max Blend": scale 2 kg) provided with a tornado type agitator illustrated in FIG. 4 was charged with 460 g of IPN-10 and 1 g of sodium hydroxide (0.05 mass % relative to the theoretical quantity of an alkoxylated compound calculated from the quantities of raw materials initially charged). With the reactants in the reaction vessel kept stirred, the interior of the reaction vessel was displaced with nitrogen and heated under the atmosphere of nitrogen to 120° C. With the interior of the reaction vessel maintained at 120° C. so as to keep the ethylene oxide concentration in the gas phase to not more than 50 vol. %, 1540 g of ethylene oxide was introduced into the reaction vessel over a period of 26 hours. Then, the temperature was maintained at that level for two hours and the addition reaction was completed with a reaction time of 28 hours to afford IPN-50. The quantity of polyethylene glycol by-produced by the addition reaction mentioned above was 8.7 mass % of the total quantity of the product and the quantity of isoprene formed was 740 ppm. The numerical value J in the addition reaction mentioned above was 1021. Incidentally, in the addition reaction mentioned above, the ratio of the height of the largest liquid level in the agitating reaction vessel (m)/the diameter of the agitating reaction vessel (m) (L/S) was 1.1. The results obtained are shown in Table 2.

EXAMPLE 7

IPN-50 was obtained by following the procedure of Example 6 while using an agitating reaction vessel made of stainless steel and provided with a thermometer, a nitrogen and oxygen inlet tube, and an agitator (made by Shinko Pantec K.K. and sold under the trademark designation of "Full Zone"; C value 1.0) instead and changing the reaction temperature to 100° C. The quantity of polyethylene glycol by-produced in the addition reaction mentioned above was 3.1 mass % of the total quantity of the product and the quantity of isoprene formed was 220 ppm. The numerical value J in the addition reaction mentioned above was 575. In the addition reaction mentioned above, the ratio of the height of the largest liquid level in the agitating reaction vessel (m)/the diameter of the agitating reaction vessel (m) (L/S) was 1.1. The results obtained are shown in Table 2.

EXAMPLE 8

A stainless steel high-pressure reaction vessel similar in type to the reaction vessel of Example 6 was charged with 460 g of IPN-10 and 4 g of potassium hydroxide (0.20 mass % relative to the theoretical quantity of alkoxylated compound calculated from the quantities of the raw materials initially charged). With the reactants in the reaction vessel kept stirred, the interior of the reaction vessel was displaced with nitrogen and heated under the atmosphere of nitrogen to 100° C. With the interior of the reaction vessel maintained at 100° C. so as to keep the ethylene oxide concentration in the gas phase to not more than 50 vol. %, 1540 g of ethylene oxide was introduced into the reaction vessel over a period of 5.5 hours. Then, the temperature was maintained at that level for two hours and the addition reaction was completed with a reaction time of 7.5 hours to afford IPN-50. The quantity of polyethylene glycol by-produced by the addition reaction mentioned above was 3.3 mass % of the total quantity of the product and the quantity of isoprene formed was 140 ppm. The numerical value J in the addition reaction mentioned above was 435. Incidentally, in the addition reaction mentioned above, the ratio of the height of the largest liquid level in the agitating reaction vessel (m)/the diameter of the agitating reaction vessel (m) (L/S) was 1.1. The results obtained are shown in Table 2.

EXAMPLE 9

IPN-50 was obtained by following the procedure of Example 8 while changing the reaction time to 38 hours. The quantity of polyethylene glycol by-produced in the addition reaction mentioned above was 6.0 mass % in the total quantity of the product and the quantity of isoprene formed was 590 ppm. The numerical value J in the addition reaction mentioned above was 760. Incidentally, in the addition reaction mentioned above, the ratio of the height of the largest liquid level in the agitating reaction vessel (m)/the diameter of the agitating reaction vessel (m) (L/S) was 1.1. The results obtained are shown in Table 2.

EXAMPLE 10

A stainless steel high-pressure reaction vessel similar in type to the reaction vessel of Example 6 was charged with 330 g of 3-methyl-3-buten-1-ol and 4.4 g of sodium hydroxide (0.22 mass % relative to the theoretical quantity of alkoxylated compound calculated from the quantities of the raw materials initially charged). With the reactants in the reaction vessel kept stirred, the interior of the reaction vessel was displaced with nitrogen and heated under the atmosphere of nitrogen to 100° C. With the interior of the reaction vessel maintained at 100° C. so as to keep the ethylene oxide concentration in the gas phase to not more than 50 vol. % 1670 g of ethylene oxide was introduced into the reaction vessel over a period of 8 hours. Then, the temperature was maintained at that level for two hours and the addition reaction was completed with a reaction time of 10 hours to afford IPN-10.

Subsequently, the reaction vessel was cooled to 50° C. and then 1540 g of the product was extracted and heated under an atmosphere of nitrogen to 120° C. With the interior of the reaction vessel maintained at 120° C. so as to keep the ethylene oxide concentration in the gas phase to not more than 50 vol. %, 1540 g of ethylene oxide was introduced into the reaction vessel over a period of 13 hours. Then, the temperature was maintained at that level for two hours and the addition reaction was completed with a reaction time of 15 hours to afford IPN-50. The quantity of polyethylene glycol by-produced in the addition reaction mentioned above was 6.2 mass % in the total quantity of the product and the quantity of isoprene formed was 610 ppm. The numerical value J in the addition reaction was 1159. The catalyst in this addition reaction was the remnant of the sodium hydroxide used during the synthesis of IPN-10 performed previously. The quantity of this catalyst was 0.05 mass % relative to the theoretical quantity of alkoxylated compound calculated from the quantities of raw materials initially charged. Incidentally, in the addition reaction mentioned above, the ratio of the height of the largest liquid level in the agitating reaction vessel (m)/the diameter of the agitating reaction vessel (m) (L/S) was 1.1. The results obtained are shown in Table 2.

EXAMPLE 11

A stainless steel high-pressure reaction vessel similar in type to the reaction vessel of Example 6 was charged with 280 g of 3-buten-1-ol and 4.4 g of sodium hydroxide (0.22 mass % relative to the theoretical quantity of alkoxylated compound calculated from the quantities of the raw materials initially charged). With the reactants in the reaction vessel kept stirred, the interior of the reaction vessel was displaced with nitrogen and heated under the atmosphere of nitrogen to 100° C. With the interior of the reaction vessel maintained at 100° C. so as to keep the ethylene oxide concentration in the gas phase to not more than 50 vol. %, 1720 g of ethylene oxide was introduced into the reaction vessel over a period of 8 hours. Then, the temperature was maintained at that level for two hours and the addition reaction was completed with a reaction time of 10 hours to afford an alkoxylated compound having an average of 10 mols of ethylene oxide added to the 3-buten-1-ol (BPN-10).

Subsequently, the reaction vessel was cooled to 50° C. and then 1550 g of the product was extracted and heated under an atmosphere of nitrogen to 120° C. With the interior of the reaction vessel maintained at 120° C. so as to keep the ethylene oxide concentration in the gas phase to not more than 50 vol. %, 1550 g of ethylene oxide was introduced into the reaction vessel over a period of 15 hours. Then, the temperature was maintained at that level for two hours and the addition reaction was completed with a reaction time of 13 hours to afford an alkoxylated product having an average of mols of ethylene oxide added to the 3-buten-1-ol (BPN-50). The quantity of polyethylene glycol by-produced in the addition reaction mentioned above was 6.3 mass % in the total quantity of the product and the quantity of isoprene formed was 640 ppm. The numerical value J in the addition reaction was 1159. The catalyst in this addition reaction was the remnant of the sodium hydroxide used during the synthesis of BPN-10 performed previously. The quantity of this catalyst was 0.05 mass % relative to the theoretical quantity of alkoxylated compound calculated from the quantities of raw materials initially charged. Incidentally, in the addition reaction mentioned above, the ratio of the height of the largest liquid level in the agitating reaction vessel (m)/the diameter of the agitating reaction vessel (m) (L/S) was 1.1. The results obtained are shown in Table 2.

COMPARATIVE EXAMPLE 5

A stainless steel high-pressure reaction vessel provided with a thermometer, a nitrogen and oxygen inlet tube, and an agitator ("propeller type vane": C value 0 (with the vane completely immersed when the supply of alkylene oxide started) was charged with 460 g of IPN-10 and 1 g of sodium hydroxide (0.05 mass % relative to the theoretical quantity of alkoxylated compound calculated from the quantities of taw materials initially charged). With the reactants in the reaction vessel kept stirred, the interior of the reaction vessel was displaced with nitrogen and heated under the atmosphere of nitrogen to 140° C. With the interior of the reaction vessel maintained at 140° C. so as to keep the ethylene oxide concentration in the gas phase to not more than 50 vol. %, 1540 g of ethylene oxide was introduced into the reaction vessel over a period of 24 hours. Then, the temperature was maintained at that level for two hours and the addition reaction was completed with a reaction time of 26 hours to afford IPN-50. The quantity of polyethylene glycol by-produced by the addition reaction mentioned above was 20.0 mass % of the total quantity of the product and the quantity of isoprene formed was 1280 ppm. The numerical value J in the addition reaction mentioned above was 2052. Incidentally, in the addition reaction mentioned above, the ratio of the height of the largest liquid level in the agitating reaction vessel (m)/the diameter of the agitating reaction vessel (m) (L/S) was 1.1.

TABLE 2

|  | Exam. 1 | Exam. 6 | Exam. 7 | Exam. 8 | Exam. 9 | Exam. 10 | Exam. 11 | Comp. Exam. 1 | Comp. Exam. 5 |
|---|---|---|---|---|---|---|---|---|---|
| Product | IPN-50 | IPN-50 | IPN-50 | IPN-50 | IPN-50 | IPN-50 | IPN-50 | IPN-50 | IPN-50 |
| Reaction temperature (° C.) | 120 | 120 | 100 | 100 | 100 | 100 120 | 100 120 | 120 | 140 |
| Reaction time (hr) | 15 | 28 | 26 | 7.5 | 40 | 10 15 | 10 15 | 70 | 26 |
| Catalyst concentration (mass %) | 0.05 | 0.05 | 0.05 | 0.2 | 0.2 | 0.22 0.05 | 0.22 0.05 | 0.05 | 0.05 |
| Numerical Value J | 693 | 1021 | 575 | 435 | 760 | 466 693 | 466 693 | 2079 | 2052 |
| Numerical Value C | 1 | 1 | 1 | 1 | 1 | 1 | 1 | 0.11 | 0 |
| PEG concentration (mass %) | 6.3 | 8.7 | 3.1 | 3.3 | 6.0 | 6.2 | 6.3 | 15.7 | 20.0 |
| Isoprene concentration (ppm) | 665 | 740 | 220 | 140 | 590 | 610 | 640 | 1055 | 2052 |

As shown in Table 2, the control of the reaction conditions by virtue of the numerical value J was demonstrated to permit effective repression of the occurrence of impurities.

REFERENTIAL EXAMPLE 1

Production of Polycarboxylic Acid for Use in Cement Dispersing Agent

In a glass reaction vessel provided with a thermometer, a stirrer, a dropping funnel, a nitrogen inlet tube, and a reflux condenser, 800 g of the IPN-50 produced in Example 1, 83 g of maleic acid, and 546 g of deionized water were placed, heated as stirred to 65° C., and then mixed with 2.4 g of an aqueous solution of 30% hydrogen peroxide. Then, a solution having 0.9 g of ascorbic acid dissolved in 39.1 g of deionized water was added dropwise to the resultant mixture in the reaction vessel over a period of one hour. Thereafter, the temperature was maintained at that level for one hour to allow completion of the copolymerizing reaction. The solution was adjusted to pH 7.0 by dropwise addition of an aqueous solution of 30% sodium hydroxide to afford a cement dispersing agent grade polycarboxylic acid having a weight average molecular weight of 27,300.

REFERENTIAL EXAMPLES 2 AND 3

Production of Cement Dispersing Agent Grade Polycarboxylic Acid

A cement dispersing agent grade polycarboxylic acid was obtained by following the procedure of Referential Example 1 while using the IPN-50 produced in Example 6 in Referential Example 2 and the IPN-50 produced in Comparative Example 1 in Referential Example 3 respectively in the place of the IPN-50 produced in Example 1. The weight average molecular weight of the polycarboxylic acid obtained in Referential Example 2 was 23,900 and the weight average molecular weight of the polycarboxylic acid obtained in Referential Example 3 was 20,400.

The cement dispersing agent grade polycarboxylic acids obtained in Referential Examples 1~3 cited above were evaluated for the mortar flow value by the following method.

A mortar was prepared by mechanically kneading 400 g of ordinary Portland cement produced by Taiheiyo Cement K.K., 800 g of the Toyoura Standard Sand, and 260 g of deionized water containing a given cement dispersing agent grade polycarboxylic acid (having a solid content of 0.14 mass % based on cement) by the use of a mortar mixer at room temperature for three minutes. A hollow cylinder measuring 55 mm in diameter and 55 mm in height and mounted on a stainless steel plate was packed with the mortar and lifted vertically so as to allow the mortar to spread out on the stainless steel plate. The diameters of the spread mass of the mortar in two directions were measured and the values thus found were averaged to determine the mortar flow value. The results were as shown below.

Referential Example 1 (using IPN-50 produced in Example 1): 110 mm

Referential Example 2 (using IPN-50 produced in Example 2): 105 mm

Referential Example 3 (using IPN-50 produced in Comparative Example 1): 68 mm

From the results given above, it is noted that the polycarboxylic acid derived from the alkoxylated compound produced by utilizing the method of this invention can manifest a high mortar flow value as a cement dispersing agent.

The entire disclosure of Japanese Patent Application No. 2001-146786 filed on May 16, 2001 and No. 2002-076957 filed on Mar. 19, 2002, including specification, claims, drawings and summary are incorporated herein by reference in its entirety.

What is claimed is:

1. A method for producing an alkoxylated compound by supplying an alkylene oxide to an active hydrogen-containing compound delivered to an agitating reaction vessel, characterized by a reaction solution in the process of an alkylene oxide addition reaction having highest viscosity of not less than 10 mPa·s, the reaction solution being stirred by the rotation of a vane or vanes continuously disposed in the vertical direction in the agitating reaction vessel, and the numerical value C represented by the following formula (1):

$$C = A/(h_2 - h_1) \qquad (1)$$

(wherein A denotes the length (m) of the vane or the vanes newly immersed by the supply of alkylene oxide, $h_1$ denotes the height (m) of the liquid level before the supply of alkylene oxide, and $h_2$ denotes the height (m) of the liquid level after the supply of alkylene oxide) being not less than 0.5.

2. A method according to claim 1, wherein the active hydrogen-containing compound is a polyalkylene ($C_2$~$C_4$) imine.

3. A method according to claim 1, wherein the numerical value C is not less than 0.7.

4. A method for producing an alkoxylated compound by supplying an alkylene oxide to an active hydrogen-containing compound delivered to an agitating reaction vessel, characterized by a reaction solution being stirred by the rotation of a vane or vanes disposed continuously in the vertical direction in the agitating reaction vessel, the reaction solution being stirred to remove impurities and/or a solvent by the rotation of the vane or the vanes after the addition of alkylene oxide, and the numerical value C' represented by the following formula (2):

$$C'=B/(h_2-h_3) \qquad (2)$$

(wherein B denotes the length (in) of the vane or the vanes newly exposed to the gas phase in consequence of the decrease of the reaction solution, $h_2$ denotes the height (m) of the liquid level after the supply of the alkylene oxide, and $h_3$ denotes the height (in) of the liquid level after the treatment for removal of impurities or solvent) being not less than 0.5.

5. A method according to claim 4, wherein the reaction solution after the addition of alkylene oxide is bubbled with an inert gas supplied through not less than two gas outlets.

6. A method according to claim 1, characterized by the active hydrogen-containing compound being an alkenyl group-containing hydroxy compound and the reaction temperature (X), reaction time (Y), and catalyst concentration (Z) during the alkylene oxide addition reaction satisfying the following formula (3):

$$\text{Numerical Value } J=300+0.033X^2Y-6.5XY+300Z+330Y<1900 \qquad (3)$$

(wherein X denotes the reaction temperature (° C.), Y denotes the reaction time (time (hr) for the introduction of alkylene oxide+time (hr) for aging), and Z denotes the catalyst concentration (the mass % of the catalyst relative to the theoretical quantity of the alkoxylated compound calculated from the quantities of a charged raw materials).

7. A method according to claim 6, wherein the average number of mols of the alkylene oxide added to said alkenyl group-containing hydroxy compound is not less than 40.

8. A method according to claim 6, wherein the quantity of a polyalkylene oxide by-produced by the alkylene oxide addition reaction is not more than 15 mass % relative to the total quantity of the product of the alkylene oxide addition reaction.

9. A method for producing an alkoxylated compound having an average addition number of not less than 40 mols of alkylene oxide added by supplying alkylene oxide to an alkenyl group-containing hydroxy compound in the presence of a catalyst, characterized by the reaction temperature (X), reaction time (Y), and catalyst concentration (Z) during the alkylene oxide addition reaction satisfying the following formula (3):

$$\text{Numerical Value } J=300+0.033X^2Y-6.5XY+300Z+330Y<1900 \qquad (3)$$

(wherein X denotes the reaction temperature (° C.), Y denotes the reaction time (time (hr) for the introduction of alkylene oxide+time (hr) for aging), and Z denotes the catalyst concentration (the mass % of the catalyst relative to the theoretical quantity of the alkoxylated compound calculated from the quantities of a charged raw materials).

10. A method according to claim 9, characterized by the reaction temperature (X), reaction time (Y), and catalyst concentration (Z) during the alkylene oxide addition reaction satisfying the following formula (4):

$$\text{Numerical value } J=300+0.033X^2Y-6.5XY+300Z+330Y<575 \qquad (4).$$

* * * * *